(12) United States Patent
Bowlin et al.

(10) Patent No.: US 7,011,789 B1
(45) Date of Patent: Mar. 14, 2006

(54) SLAG SCRAPER FOR CUTTING TABLE

(75) Inventors: Bobby P. Bowlin, Fort Worth, TX (US); Paul D. Bowlin, Saginaw, TX (US)

(73) Assignee: Bowlin Engineering Co., Fort Worth, TX (US)

( * ) Notice: Subject to any disclaimer, the term of this patent is extended or adjusted under 35 U.S.C. 154(b) by 275 days.

(21) Appl. No.: 10/465,174

(22) Filed: Jun. 19, 2003

Related U.S. Application Data

(60) Provisional application No. 60/391,465, filed on Jun. 25, 2002.

(51) Int. Cl.
*B23K 7/08* (2006.01)

(52) U.S. Cl. .............................. 266/49; 266/48; 148/196
(58) Field of Classification Search .................. 266/48, 266/49; 148/196
See application file for complete search history.

(56) References Cited

U.S. PATENT DOCUMENTS 3,666,249 A * 5/1972 MacLeod, Jr. ............... 266/65
3,999,744 A * 12/1976 Kotch ........................... 266/48
6,039,915 A    3/2000 Minter et al.
6,165,410 A * 12/2000 Crees et al. .................. 266/49

* cited by examiner

Primary Examiner—Scott Kastler
(74) Attorney, Agent, or Firm—Bracewell & Giuliani LLP

(57) ABSTRACT

A scraper removes debris from under a work table, particularly slag resulting from cutting of metal. A pair of parallel tracks extends along opposite sides of a collection area under the table. A blade carriage is carried on the tracks and driven between forward and rearward positions. A pair of arm assemblies are connected to opposite sides of the blade and pivotally mounted to the carriage for moving the blade between a scraping position and a retracted position. A forward notch on each of the tracks is contacted by the arm assembly after reaching the forward position to cause the arm to move the blade from the scraping position to the retracted position during rearward movement. A rearward notch on each of the tracks is contacted by the arm assembly after reaching the rearward position and commencing forward movement to cause the arm to move the blade from the retracted position to the scraping position. The carriage is moved by continuous cables.

20 Claims, 4 Drawing Sheets

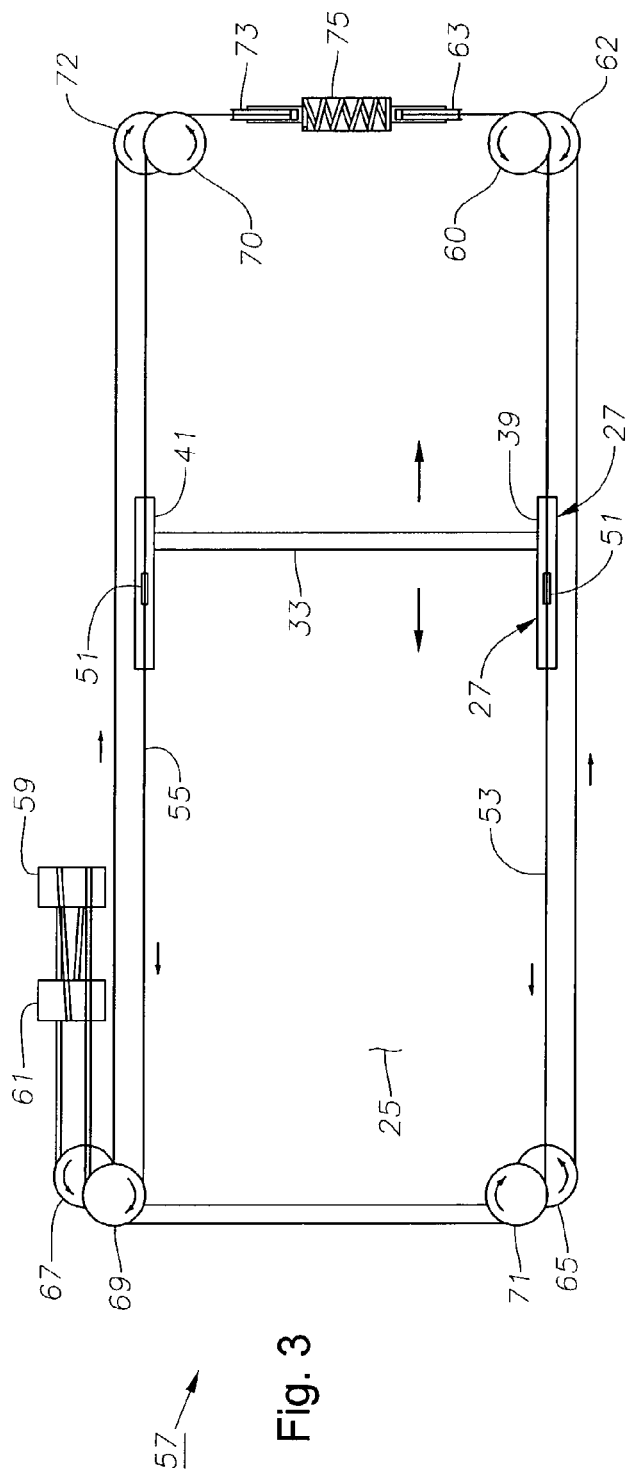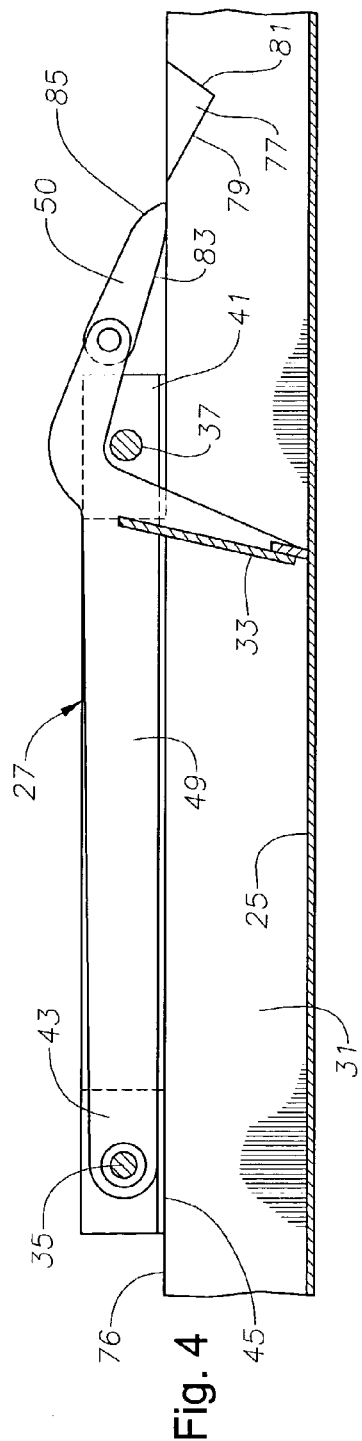

US 7,011,789 B1

SLAG SCRAPER FOR CUTTING TABLE

This invention claims the provisional application filing date of Jun. 25, 2002, Ser. No. 60/391,465.

FIELD OF THE INVENTION

This invention relates in general to devices for removing debris from under a work table, and in particular to a scraping blade assembly for removing slag from under a torch cutting table.

BACKGROUND OF THE INVENTION

One method for cutting metal plate is to place the plate on a table that has a grid. Torches are mounted to a gantry and moved longitudinally and laterally over the table to cut the metal. Molten metal where the torch cuts falls through the grid to a collection area below the table. This debris, typically called slag, builds up and must be removed.

One type of removal device uses a blade that is mounted to a blade carriage carried on tracks under the table. Typically the blade carriage is driven by an electrical motor and a rack and pinion gear arrangement on the tracks. Debris from the table tends to fall on the gear arrangement and the motor. The debris hampers operation of the blade carriage and must be cleaned by other means.

SUMMARY OF THE INVENTION

The apparatus of this invention has a blade carriage located under a work table. A drive mechanism conveys the blade carriage under the table between forward and rearward positions. A blade is mounted to the blade carriage by an arm assembly. The arm assembly moves the blade between a scraping position, in which a lower edge of the blade contacts the collection surface, and a retracted position in which the lower edge of the blade is spaced above the collection surface.

A forward trip member is contacted by the arm assembly at the forward position to cause the arm to move the blade from the scraping position to the retracted position. A rearward trip member is contacted by the arm assembly at the rearward position to cause the arm to move the blade from the retracted position to the scraping position.

In the preferred embodiment, the arm has a pivot end that is mounted to a pivot point on the blade carriage, and a blade end that is secured to the blade. A pawl is rotatably mounted to the blade end of the arm, the pawl rotating under the blade end of the arm to elevate the blade end of the arm and move the blade to the retracted position when contacting the forward trip member as the blade carriage moves rearward. The pawl rotates out from under the blade end of the arm to lower the blade end of the arm and move the blade to the scraping position when contacting the rearward trip member as the blade carriage moves forward.

The drive mechanism for moving the blade carriage in the preferred embodiment has a driven drum mounted adjacent one side of the collection area. A left-side cable having first and second ends is secured to a left side of the blade carriage and extends along a left side of the collection area to the drum. A right-side cable having first and second ends secured to a right side of the blade carriage and extends along a right side of the collection area to the drum. Rotating the drum in one direction causes the cables to move the blade carriage in a forward direction, and rotating the drum in an opposite direction causes the cables to move the blade carriage in a rearward direction.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 3 is a schematic, plan view of a cable drive system of the table of FIG. 1.

FIG. 4 is a left side view of the right portion of the blade assembly of FIG. 2, the blade assembly located on tracks, a pawl being in a first position.

DETAILED DESCRIPTION OF THE INVENTION

Figure 1:
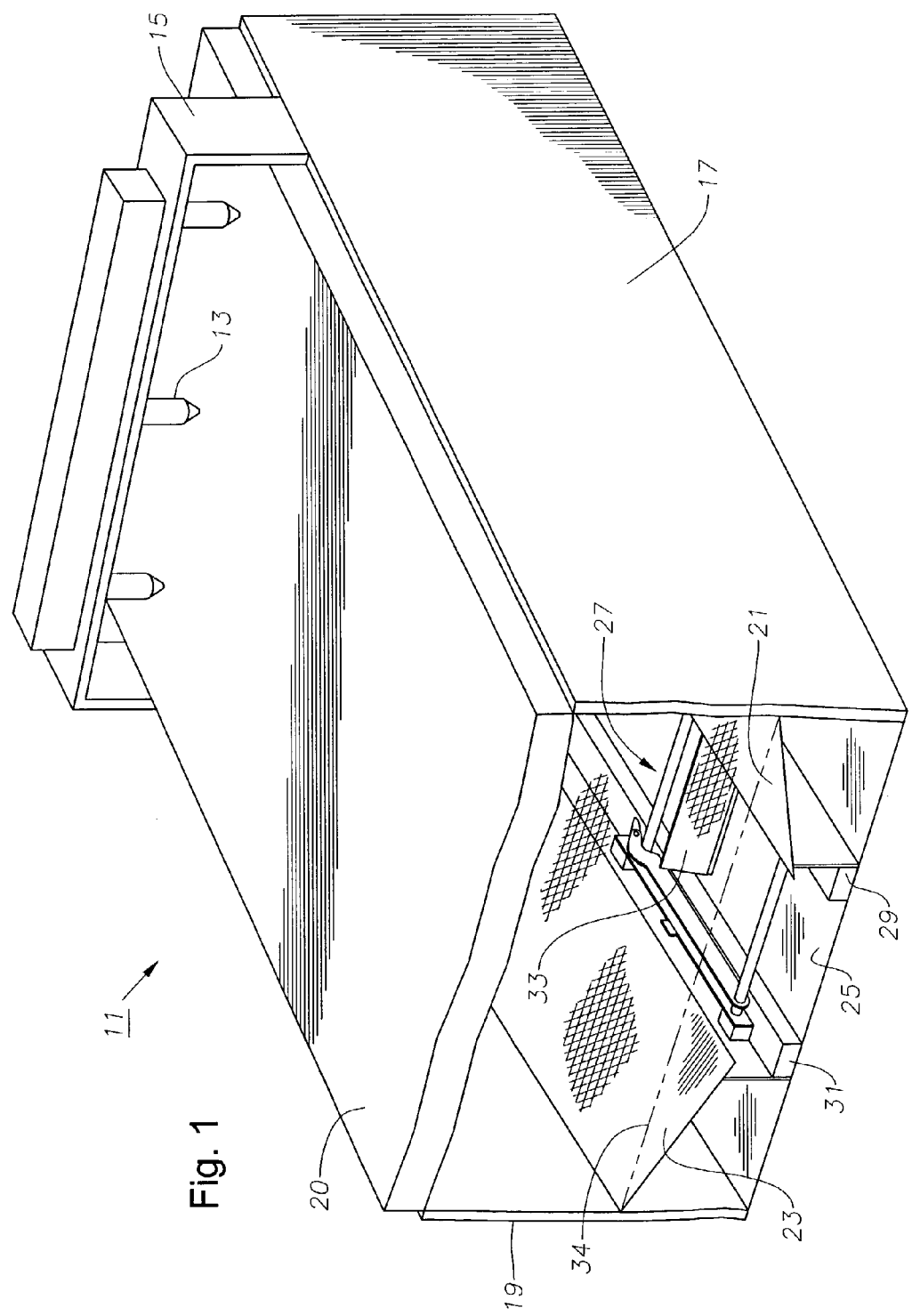
FIG. 1 is a perspective view of a cutting table constructed according to the present invention.

Referring to the figures, a cutting table 11 has at least one cutting torch 13 on moveable gantry 15, table 11 being shown in FIG. 1 with three torches 13. Table 11 is a rectangular box structure, having vertical walls 17, 19 with a grid extending between (not shown) for supporting a workpiece 20 and gantry 15 at an upper portion of table 11. Gantry 15 and workpiece 20 may rest on separate sets of rails (not shown). Torches 13 are used to cut workpiece 20, producing waste material in the form of gaseous materials and solid materials, called slag. The gases are vented away from table 11, but the slag falls through the upper portion of table 11 and into the volume between walls 17, 19.

Inclined plates 21, 23 are mounted to the inner surfaces of walls 17, 19, respectively, creating a longitudinal funnel for directing the slag toward a collection surface 25 of table 11. A blade assembly 27 is moveable longitudinally and rides on tracks 29, 31 located on either side of surface 25. Plates 21, 23 extend toward the centerline of table 11 to position the inner edges of plates 21, 23 such that slag falls from plates 21, 23 onto collection surface 25 between tracks 29, 31. Blade assembly 27 has a blade 33 for scraping collection surface 25, assembly 27 reciprocating between forward and rearward ends of table 11 for moving accumulated slag to the forward end of table 11 for collection and disposal. The words "forward" and "rearward" are used for convenience only. A mesh or grate 34 may be located above plates 21, 23.

Figure 2:
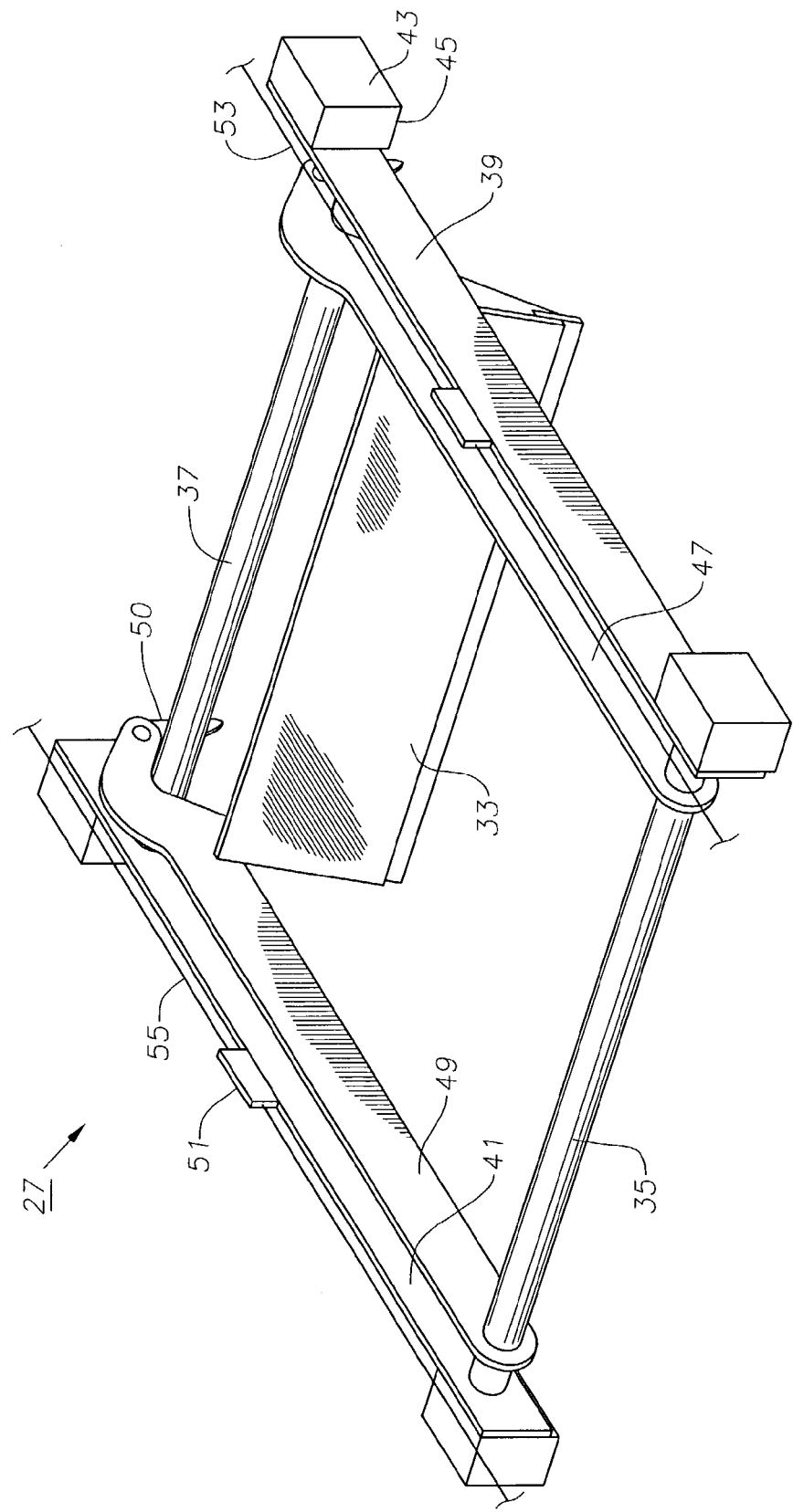
FIG. 2 is a perspective view of a blade assembly of the table of FIG. 1.

Blade assembly 27 is illustrated in FIG. 2. Shafts 35, 37 extend through and connect forward and rearward portions of longitudinal members 39, 41, forming a rectangular perimeter frame. Slider blocks 43, which are preferably formed of plastic or cast iron, are mounted on the outer ends of shafts 35, 37, the lower surface 45 of each block 43 being lower than the lower edge of members 39, 41 to provide a sliding support surface for assembly 27. Blocks 43 slide on top of tracks 29, 31.

Blade 33 is attached to a rear portion of each of two pivoting arms or arms 47, 49, blade 33 being located between arms 47, 49. The forward end of each arm 47, 49 is pivotally connected to shaft 35, and the rearward end is moveable vertically relative to shaft 37. A pawl 50 is pivotally connected to the rearward end of each arm 47, 49, pawls 50 pivoting between a scraping position, in which blade 33 is in a lower, scraping position during a forward stroke, to a retracted position, in which blade 33 is in a retracted position during a return stroke. Each member 39, 41 has a connector 51 on its upper edge for fixedly receiving a cable 53, 55, cables 53, 55 being driven for moving assembly 27.

FIG. 3 illustrates cable system 57 for moving assembly 27. Grooved drums 59, 61 are located to one side of cable system 57, drum 59 being driven by a motor (not shown). Cables 53, 55 are coiled around drums 59, 61 and are routed through a series of pulleys, both ends of each cable 53, 55 being affixed to the corresponding connector 51 on members 39, 41 for creating continuous cable loops. Pulleys 60, 62, 63, are located at a rear portion of table 11 on what will be considered for convenience only, a left side of the collection surface 25 (FIG. 1). Pulleys 65, 67, 69, 71 are located at a forward portion of table 11. Pulleys 65, 71 are located on the opposite lateral side, or left side of table 11 from drums 59, 61, whereas pulleys 67, 69 are located near drums 59, 61. Pulleys 70, 72 and 73 are located at the rearward end of table 11 on the right side.

Cable 53 begins at left-side connector 51 on member 39, then extends rearward around first left rearward pulleys 60, 63. From there, cable 53 extends around second left rearward pulley 62 forward to a first left-side forward pulley 65 and across to a first forward right-side pulley 67. From there, cable 53 winds onto drums 59, 61, and then is routed forward to a second forward right-side pulley 69. From there, cable 53 extends back across to a second forward left-side pulley 71 then rearward to left connector 51 on member 39.

Cable 55 begins at right-side connector 51 on member 41, then extends rearward and around rearward right-side pulleys 70, 73. Cable 55 extends around second rearward right-side pulley 72 forward to first right-side pulley 67 and winds onto drums 59, 61. Cable 55 then extends forward to second right-side pulley 69, then rearward to right-side connector 51 on member 41. A tension device is used to maintain tension in cables 53, 55, for example, spring 75 shown connecting rearward pulleys 63, 73.

As drum 59 is rotated by the motor, cables 53, 55 feed simultaneously onto drum 61 then into their respective cable loops. Rotation of drum 59 in one direction causes forward movement of blade assembly 27, whereas rotation in the other direction causes rearward movement of blade assembly 27. The friction of cables 53, 55 on drum 61 provides additional friction to that between cables 53, 55 on drum 59, ensuring that cables 53, 55 do not slip. As indicated by the arrows, when blade 33 is moving forward, first forward pulleys 67, 71 rotate clockwise and second forward pulleys 65. 67 rotate counterclockwise. Similarly, first rearward pulleys 60, 70 rotate counterclockwise while second rearward pulleys 62, 72 rotate clockwise. By providing cable system 57 with cables 53, 55 located laterally outward of blade 33, slag falling onto collection surface 25 does not contaminate cable system 57, allowing for less required maintenance and more reliable operation of table 11.

Figure 5:
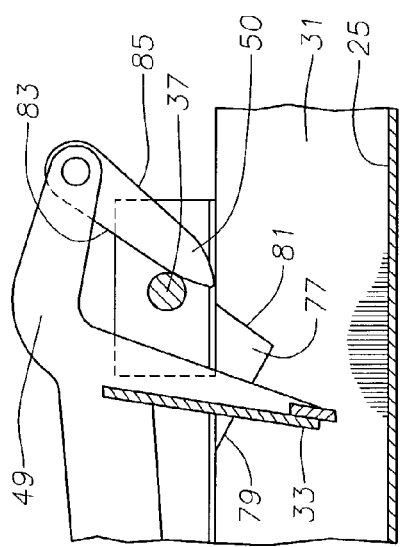
FIG. 5 is a side view of a portion of the right side shown in FIG. 4, the pawl being moved to a second position.

The right-side portion of blade assembly 27 is shown positioned on track 31 in FIG. 4, the left-side portion being a mirror image of the right-side portion positioned on track 29. As shown, the rear portion of member 49 is in the lower position with blade 33 is in the engaged position, the lower edge of blade 33 being in contact with collection surface 25. This position is used when blade assembly 27 is moving forward for scraping slag accumulated on collection surface 25. Pawl 50 is in the first position, which is a trailing orientation, allowing blade to rest on collection surface 25. Surface 45 of each sliding block 43 slides on upper surface 76 of track 31. Pawl 50 is in the scraping position of FIG. 4 when blade assembly 27 is moving to the left, or forward for scraping. Pawl 50 is in the retraction position of FIG. 5 when blade assembly 27 is moving to the right, or rearward after a scraping stroke.

Trip members or notches 77 are located at rearward inner locations on both tracks 29, 31 and are formed in surface 76, notches 77 having an inclined forward ramp 79 and an inclined rear ramp 81. Notches 77 rotate pawls 50 between the first and second positions as pawls 50 engage notches 77 during travel of blade assembly 27.

FIG. 4, shows blade assembly 27 after is has already moved rearward of notches 77 and has started moving forward during a scraping stroke. During the retraction stroke, pawl 50 would have been in the retracted position of FIG. 5. As pawl 50 moves rearward into notch 77 while retracted, notch 77 will not change the position of pawl 50. Once rearward of notch 77, a limit switch causes blade assembly 27 to move forward. As pawl 50 falls into notch 77 on the forward stroke, notch 77 will rotate pawl 50 back from the retracted position of FIG. 5 to the scraping position of FIG. 4. Notches 77 thus serve as rearward tripping members to cause blade 33 to move from a retracted to a scraping position.

Figure 6:
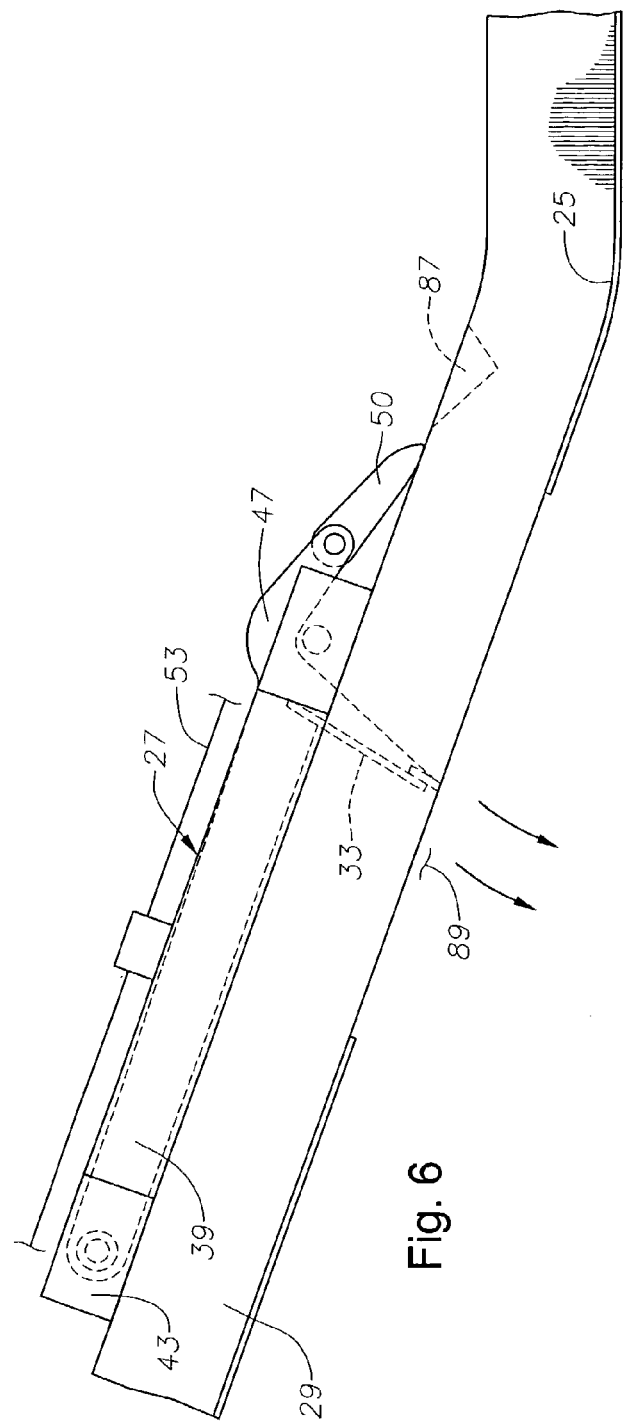
FIG. 6 is a left side view of the blade assembly of FIG. 2 on a forward end of the tracks of FIG. 4.

FIG. 6 is a left-side view showing the forward end of track 29 and blade assembly 27 at its forward most point. A forward portion of each track 29, 31 is inclined, and blade assembly 27 slides up the inclined portions during the forward stroke. Tracks 29, 31 have trip members or notches 87 on the inclined portions, notches 87 being formed to have the same shape and function as notches 77 (FIG. 4), except they serve to move blade 33 from the scraping position to the retracted position. Collection surface 25 terminates on the inclined portions, creating hole 89 between tracks 29, 31. As blade assembly 27 is moved forward toward the end of collection surface 25, blade 33 continues in contact with collection surface 25, pushing slag ahead of blade 33. Blade 33 pushes slag until blade 33 reaches hole 89, through which slag falls. A cart (not shown) or other container is preferably located below hole 89 for containing slag for removal from table 11.

During the forward stroke, blade assembly 27 to a position wherein pawls 50 are forward of notches 87, then a limit switch causes blade assembly 27 to start moving rearward. As blade assembly 27 moves rearward, pawls 50 engage notches 87, rotating pawls 50 to the retracted position of FIG. 5. This lifts arms 47, 49 and blade 33 to the retracted position. Blade assembly 27 moves rearward in the return stroke until pawls 50 pass rear notches 77, then pawls 50 engage notches 77 on the start of the forward stroke to return blade to the engaged position as assembly 27 is moved forward on the next forward stroke.

Referring to the figures in operation, a workpiece 20 is placed on table 11, and torches 13 are positioned by gantry 15 for cutting workpiece 20. Slag and other wastes are produced, which fall into the interior of table 11. To cause the slag to collect near the center of table 11 on collection surface 25, inclined plates 21, 23 funnel falling material towards surface 25 and inward of tracks 29, 31.

Blade assembly 27 is operated by a cable system 57 for stroking assembly 27 forward and rearward, slider blocks 41, 43 on assembly 27 sliding on tracks 29, 31. Blade assembly 27 is moved forward with blade 33 in an engaged position in contact with collection surface 25, blade 33 scraping accumulated slag from surface 25 and pushing the slag forward ahead of blade 33. At the forward end of the scraping stroke, blade assembly rides up inclined portions of tracks 29, 31, and blade 33 pushes slag out of a hole 89 located at the end of collection surface 25. Slag preferably falls into a removable container (not shown) for removal of slag from table 11.

As blade assembly is moved rearward in a return stroke, pawls 50 engage notches 87, rotating pawls and lifting arms 47, 49 and blade 33. In this position, blade 33 is spaced from collection surface 25, allowing blade to return the rear end of table 11 without scraping slag. Pawls 50 remain in this position through the return stroke. At the end of the return stroke, the direction of travel of blade assembly 27 is again reversed, and pawls 50 engage notches 77 for rotating the lower ends of pawls 50 to a trailing position, allowing arms 47, 49 and blade 33 to drop into the engaged position for scraping surface 25 during the forward stroke.

The present invention has several advantages. The blade assembly scrapes slag from a collection surface and pushes the slag forward for deposit in a removable container. The blade automatically retracts when moving rearward after a forward stroke, and automatically returns to the scraping position when again moving forward. Inclined plates funnel the slag towards the collection surface and within tracks for the blade assembly, preventing the slag from landing on the tracks. The cable system around the perimeter of the blade assembly path is used to move the blade assembly, preventing slag from contaminating the cable system. The cable system eliminates a need for a rack-and-pinion or similar drive system that is located in the dirty areas and the possible need for the blade assembly to carry a motor.

While the invention has been shown in only one of its forms, it should be apparent to those skilled in the art that it is not so limited, but is susceptible to various changes without departing from the scope of the invention.

We claim:

1. An apparatus for removing debris from under a work table, comprising:
   a blade carriage;
   a drive mechanism for conveying the blade carriage under the table between forward and rearward positions;
   a blade;
   an arm assembly connected to the blade and movably mounted to the carriage for moving the blade between a scraping position, in which a lower edge of the blade is adapted to contact and scrape a collection surface under the table as the carriage moves forward, and a retracted position in which the lower edge of the blade is adapted to be spaced above the collection surface as the carriage moves rearward;
   a forward trip member for contact by the arm assembly at the forward position to cause the arm to move the blade from the scraping position to the retracted position; and
   a rearward trip member for contact by the arm assembly at the rearward position to cause the arm to move the blade from the retracted position to the scraping position.

2. The apparatus according to claim 1, further comprising a pair of parallel tracks adapted to be mounted under the table on opposite sides of the collection surface for supporting the blade carriage as the blade carriage moves between the forward and rearward positions.

3. The apparatus according to claim 1, further comprising a track adapted to be mounted under the table adjacent the collection surface; and wherein
   the arm assembly moves along the track as the carriage moves between the forward and rearward positions; and
   the forward trip and rearward trip members are located on the tracks.

4. The apparatus according to claim 1, wherein:
   movement of the blade carriage and the arm assembly in a rearward direction relative to the forward trip member causes the blade to move to the retracted position; and
   movement of the blade carriage and the arm assembly in a forward direction relative to the rearward trip member causes the blade to move to the scraping position.

5. The apparatus according to claim 1, wherein the arm assembly comprises:
   an arm with a pivot end that is mounted to a pivot point on the blade carriage, and a blade end that is secured to the blade; and
   a pawl rotatably mounted to the blade end of the arm, the pawl rotating under the blade end of the arm to elevate the blade end of the arm and move the blade to the retracted position when contacting the forward trip member as the blade carriage moves rearward, the pawl rotating out from under the blade end of the arm to lower the blade end of the arm and move the blade to the scraping position when contacting the rearward trip member as the blade carriage moves forward.

6. The apparatus according to claim 1, further comprising a pair of parallel tracks on which the carriage moves, the tracks having an upward curved portion at the forward position that is adapted to extend above the collection surface to assist in disposing of the debris.

7. The apparatus according to claim 1, wherein the drive mechanism comprises:
   a pair of cables secured to opposite sides of the blade carriage, the cables being drawn in forward and rearward directions to move the blade carriage between the forward and rearward positions.

8. The apparatus according to claim 1, wherein the drive mechanism comprises:
   a driven drum;
   a left-side cable having first and second ends secured to a left side of the blade carriage and extending along a left side of the collection area to the drum; and
   a right-side cable having first and second ends secured to a right side of the blade carriage and extending along a right side of the collection area to the drum, so that rotating the drum in one direction causes the cables to move the blade carriage in a forward direction, and rotating the drum in an opposite direction causes the cables to move the blade carriage in a rearward direction.

9. An apparatus for removing debris from under a work table, comprising:
   a pair of parallel tracks adapted to extend along opposite sides of a collection area under the table;
   a blade carriage that is carried on the tracks;
   a drive mechanism for conveying the blade carriage on tracks between forward and rearward positions;
   a blade;
   a pair of arm assemblies connected to opposite sides of the blade and movably mounted to the carriage for moving the blade between a scraping position, in which a lower edge of the blade is adapted to contact and scrape the collection surface under the table as the carriage moves forward, and a retracted position in which the lower edge of the blade is adapted to be spaced above the collection surface as the carriage moves rearward;

a stationary forward trip member on each of the tracks and positioned for contact by the arm assembly after reaching the forward position and commencing rearward movement to cause the arm to move the blade from the scraping position to the retracted position during rearward movement; and a stationary rearward trip member on each of the tracks and positioned for contact by the arm assembly after reaching the rearward position and commencing forward movement to cause the arm to move the blade from the retracted position to the scraping position.

10. The apparatus according to claim 9, wherein the trip members comprise notches formed in the rails.

11. The apparatus according to claim 9, wherein each of the arm assemblies comprises:

an arm with a pivot end that is mounted to a pivot point on the blade carriage, and a blade end that is secured to the blade; and a pawl rotatably mounted to the blade end of the arm, the pawl rotating under the blade end of the arm to elevate the blade end of the arm and move the blade to the retracted position when contacting the forward trip member as the blade carriage moves rearward, the pawl rotating out from under the blade end of the arm to lower the blade end of the arm and move the blade to the scraping position when contacting the rearward trip member as the blade carriage moves forward.

12. The apparatus according to claim 9, wherein the drive mechanism comprises:

a pair of cables secured to opposite sides of the blade carriage, the cables being drawn in forward and rearward directions to move the blade carriage between the forward and rearward positions.

13. The apparatus according to claim 9, wherein the drive mechanism comprises:

a driven drum;

a left-side cable having first and second ends secured to a left side of the blade carriage and extending along a left side of the collection area to the drum; and a right-side cable having first and second ends secured to a right side of the blade carriage and extending along a right side of the collection area to the drum, so that rotating the drum in one direction causes the cables to move the blade carriage in a forward direction, and rotating the drum in an opposite direction causes the cables to move the blade carriage in a rearward direction.

14. The apparatus according to claim 9, wherein the tracks have upward curved portions at the forward position that is adapted to extend above the collection surface to assist in disposing of the debris.

15. An apparatus for removing debris from a collection area under a work table, comprising:

a pair of parallel tracks adapted to extend along opposite sides of a collection area under the table;

a blade assembly having a carriage that is carried on the tracks and a blade that is carried by the carriage for movement between an upper retracted position and a lower scraping position relative to the tracks;

a drive mechanism for conveying the carriage on the tracks between forward and rearward positions;

a forward trip member at a forward end of the tracks that engages the blade assembly and causes the blade to move from the scraping position to the retracted position; and a rearward trip member at a rearward end of the tracks that engages the blade assembly and causes the blade to move from the retracted position to the scraping position.

16. The apparatus according to claim 15, wherein:

the tracks have upward curved portions at the forward end that are adapted to extend above the collection surface to assist in disposing of the debris.

17. The apparatus according to claim 15, wherein:

the blade assembly further comprises an arm with a pivot end that is mounted to a pivot point on the carriage, the arm having a blade end that is secured to the blade, the arm pivoting about the pivot point when the blade moves between the scraping and retracted positions.

18. A method for removing debris from under a work table, comprising:

(a) mounting a blade to a blade carriage with a pivotal arm assembly;

(b) with the blade in a scraping position, in which a lower edge of the blade contacts a collection surface under the table, moving the carriage forward from a rearward end of the collection surface to push debris from the collection surface; then (c) at the forward end of the collection surface, engaging the arm assembly with a forward trip member, thereby causing the arm assembly to lift the blade to a retracted position in which the lower edge of the blade is spaced above the collection surface and moving the carriage rearward; and then (d) at the rearward end of the collection surface, engaging the arm assembly with a rearward trip member, thereby causing the arm assembly to lower the blade to the scraping position in order to repeat step (b).

19. The method according to claim 18, wherein:

step (c) occurs after the blade carriage has reached a forward position and is moving rearward.

20. The method according to claim 18, wherein:

step (d) occurs after the blade carriage has reached a rearward position and is moving forward.

* * * * *